United States Patent [19]

Albonetti

[11] Patent Number: 4,850,860
[45] Date of Patent: Jul. 25, 1989

[54] RADIANT WALL FOR HEAT EXCHANGERS, MUFFLE KILNS AND SIMILAR EQUIPMENT

[76] Inventor: Alberto Albonetti, no. 5/H Via Venturi, Casinalbo-Modena, Italy

[21] Appl. No.: 194,314

[22] Filed: May 16, 1988

[30] Foreign Application Priority Data

Jun. 19, 1987 [IT] Italy ............................. 40073 A/87

[51] Int. Cl.⁴ .......................... F27B 9/28; F27D 3/00
[52] U.S. Cl. .................................. 432/59; 432/175; 432/141; 432/206; 432/209
[58] Field of Search ............... 432/209, 206, 246, 236, 432/175, 8, 59; 165/6, 10, 86

[56] References Cited

U.S. PATENT DOCUMENTS

| | | | |
|---|---|---|---|
| 1,923,815 | 8/1933 | Fahrenwold | 432/246 |
| 2,800,317 | 7/1957 | Ipsen | 432/209 |
| 3,188,068 | 6/1965 | Schmidt | 432/206 |
| 3,425,675 | 2/1969 | Twine | 432/209 |
| 3,917,445 | 11/1975 | Suva et al. | 432/141 |
| 4,222,987 | 9/1980 | Keller | 432/209 |
| 4,373,702 | 2/1983 | Jayaraman et al. | 432/175 |
| 4,448,401 | 5/1984 | Jalil et al. | 432/59 |
| 4,526,538 | 7/1985 | Redell et al. | 432/246 |

FOREIGN PATENT DOCUMENTS 1535098 12/1978 United Kingdom .

*Primary Examiner*—Henry C. Yuen
*Attorney, Agent, or Firm*—Fay, Sharpe, Beall, Fagan, Minnich & McKee

[57] ABSTRACT

A radiant wall (6) for heat exchangers, muffle kilns and similar equipment, consisting in a succession of rollers (11) suspended side by side in such a way as to create a physical barrier for the separation of two environments accommodating media between which an exchange of heat is brought about.

7 Claims, 2 Drawing Sheets

Fig. 3
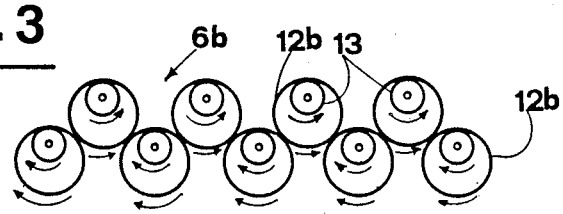
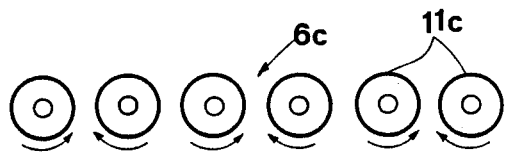
Fig. 4
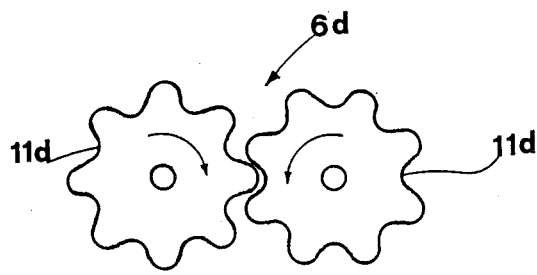
Fig. 5
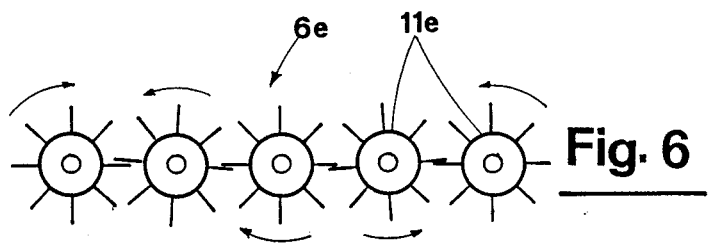
Fig. 6
Fig. 3a
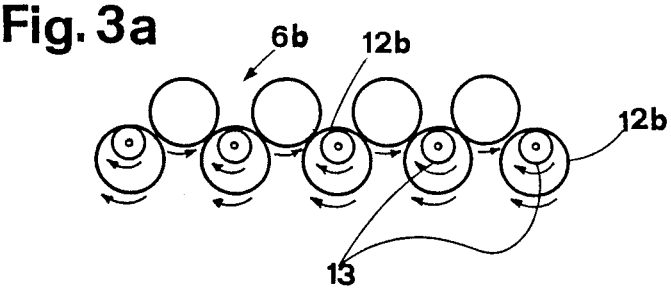

RADIANT WALL FOR HEAT EXCHANGERS, MUFFLE KILNS AND SIMILAR EQUIPMENT

BACKGROUND OF THE INVENTION

The present invention relates to a radiant wall, in particular for heat exchangers, muffle kilns and similar equipment.

Such a wall lends itself to use in numerous fields of application, and more especially, wherever there may be a requirement for treatment processes that involve an exchange of heat. A typical instance is that of a kiln, in which thermal energy produced by the combustion of solid or liquid fuels, or gas, is exploited for the purpose of firing materials such as ceramics, in particular, ceramic tiles.

Another possible application is that of the ordinary heat exchanger, by means of which thermal energy is transferred from one medium to another in order, for example, to effect a recovery of heat.

One particularly advantageous application of the invention is discernable in the firing of ceramic tiles, and more precisely, in kilns of the type by which thermal energy is transmitted to the ceramic material essentially by radiation.

Whilst the prior art does indeed embrace radiant burners, the results obtained from them have been less than satisfactory, as the amount of thermal energy effectively transmissible by radiation is limited. Moreover, a not inconsiderable amount of heat exchange will always take place by convection, as thermal energy is transferred to the material directly from the hot gases generated.

In the conventional muffle system, heat exchange by radiation from the kiln walls is made possible as a result of the thermal conduction properties of the material in which the walls themselves are embodied. Such a system tends to give low efficiency, however, and there are difficulties in maintaining a stable and geometrically exact configuration of the walls, especially if disposed flat and horizontal, in the face of stresses induced by high temperature levels; thus, it is not possible to make use of lightweight structures fashioned in materials possessing high thermal conductivity.

Accordingly, the object of the present invention is that of overcoming the drawbacks and shortcomings mentioned above.

Another object of the invention is to permit of embodying a radiant wall in materials with low heat conduction properties, which nonetheless can produce heat exchange coefficients of a high order, that is, equivalent to or even greater than those obtainable from walls giving nominally high thermal conduction.

An additional object of the invention is that of enabling adjustment of the flow of thermal energy through the wall, by way of a control facility that remains substantially independent of temperature conditions.

SUMMARY OF THE INVENTION

The stated objects are realized with a radiant wall according to the invention.

The wall disclosed is intended in particular for heat exchangers, muffle kilns and similar equipment, and comprises a plurality of rotating bodies which together form a wall such as enables the separation of two environments containing means between which an exchange of thermal energy is brought about.

BRIEF DESCRIPTION OF THE DRAWINGS

The invention will now be described in detail, by way of example, with the aid of the accompanying drawings, in which:

FIGS. 3, 3a, 4, 5 and 6 show details of sections similar to those of FIGS. 1 and 2, each of which depicts a different embodiment of the invention.

DESCRIPTION OF THE PREFERRED EMBODIMENTS

Figure 1:
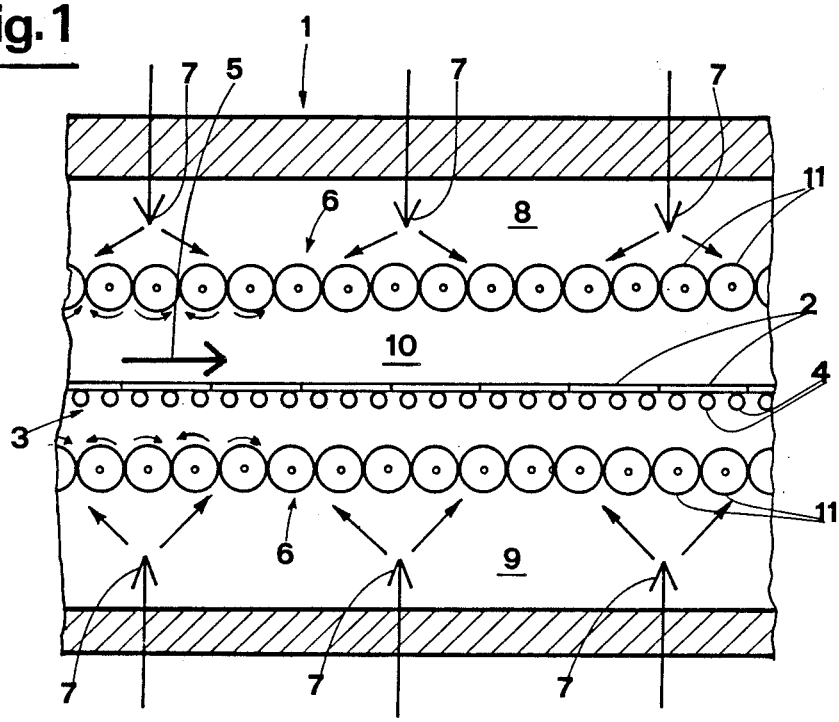
FIG. 1 is a schematic representation showing part of a kiln for the firing of ceramic tiles, viewed in longitudinal section through the median vertical plane and embodied according to the invention.

Referring to the drawings, 1 denotes a kiln for firing ceramic tiles 2, in its entirety, comprising a conveyor system that consists in a roller table 3 formed from a plurality of power driven rollers 4 disposed one beside the next with axes parallel in such a way as to create a platform. The tiles 2 move along inside the kiln 1 in the the direction denoted by the arrow 5.

Tiles 2 conveyed on the roller table 3 receive or shed thermal energy (depending on the area of the kiln) principally by radiation from and to radiant surfaces positioned at prescribed distances above and beneath the table 3. In the example of FIG. 1, these radiant surfaces are embodied as walls 6, by which the treatment chamber of the kiln is isolated from hot gases, and from the products of combustion generated by the burners; more exactly, the burners, denoted 7, operate internally of chambers 8 and 9 that are separated by the two radiant walls 6 from the chamber 10 internally of which the tiles 2 are subjected to treatment.

With heat generated by the burners 7 as hot gases, the walls 6 are invested with thermal energy from the burner chambers 8 and 9 partly by radiation and partly by convection, whereas the transmission of thermal energy across the treatment chamber 10 is effected almost exclusively by radiation between the walls 6 and the tiles 2.

According to the invention, the radiant wall 6 takes the form of a plurality of rotating bodies, embodied as a succession of cylindrical rollers 11 disposed parallel and in contact one with the next; each such roller is rotatable about its own axis, and revolves in the opposite direction to that of the two rollers 11 with which it makes contact on either side.

The rollers 11 are fashioned from a refractory material, for example ceramic or metallic, and will be hollow in a preferred embodiment, their outer cylindrical surfaces possessing properties such as ensure high coefficients of thermal emission and absorption. Propulsion is provided by a conventional mechanical drive located externally of the kiln (not shown in the drawings).

The arrangement of the rollers 11, that is to say, positioned in direct contact one with the next, is such as to ensure an efficient separation of the treatment chamber 10 from the chambers 8 and 9 that contain the hot gases produced by the burners 7. At all events, the rollers 11 will be arranged in such a way as to enable a controlled separation of the treatment chamber 10 and the outer chambers 8 and 9; indeed, should the need exist for an exchange or passage of fluids between the treatment chamber 10 and the burner chambers 8 and 9, it will suffice to construct a wall 6c using rollers 11c identical in embodiment, though spaced apart at a given distance as in FIG. 4 rather than positioned in direct contact one with the next. In this instance, the controlled passage of fluids between the burner chambers 8 and 9 and the treatment chamber 10 could be achieved by an adjustment of the static pressure levels in the different environments. Such an expedient would also render it possible, within given limits, to stream fluids between the burner chambers 8 and 9 and the treatment chamber 10, either with or against the direction of the main thermal exchange.

The fact that the rollers 11 of the walls 6 are set in rotation signifies that their peripheries become exposed to different environments in turn, i.e. that of the burner chambers 8 and 9, and that of the treatment chamber 10. Exposure to the higher temperature of the burner chamber 8 or 9 causes the surface of the single roller 11 to absorb thermal energy, which is then shed on entry into and passage through the treatment chamber 10 during subsequent rotation. Thermal energy is thus transferred to the lower temperature contents of the treatment chamber 10, ceramic tiles 2 in this instance, essentially in the form of radiant heat, since with the rollers 11 making contact one with the next above and below, the area occupied by the tiles remains isolated from the chambers 8 and 9 in which the hot gases and the products of combustion generated by the burners 7 are caused to circulate.

The fact that the rollers 11 are disposed with their axes horizontal and kept steadily revolving ensures they will not buckle as a result of plastic deformation induced by their own weight, hence by the weight of the wall as a whole; accordingly, it becomes possible to construct a horizontal radiant wall of much lighter weight, and much greater width (i.e. transverse to the path followed by the tiles), than is feasible with the static type of structure, temperature levels and heat exchanger coefficients being assumed as par.

Moreover, by varying the speed of rotation of the rollers 11 making up the wall 6, it also becomes possible to make adjustments to the flow of thermal energy exchanged through the wall, independently of other conditions, in particular temperature levels. Thus, given that the wall 6 possesses a particularly high heat exchange coefficient, adjustment of the speed of rotation of the rollers 11 will permit of obtaining a sufficiently accurate control over the quantity of thermal energy that is transferred from the higher temperature environment to the lower, hence to the material it accommodates (tiles 2, in the case in point) and viceversa. By the same token, the actual quantity of thermal energy transferred per unit of time can be held constant within given limits, simply by varying the rotational speed of the rollers 11, even with variations in temperature internally of the burner chambers 8 and 9.

Figure 2:
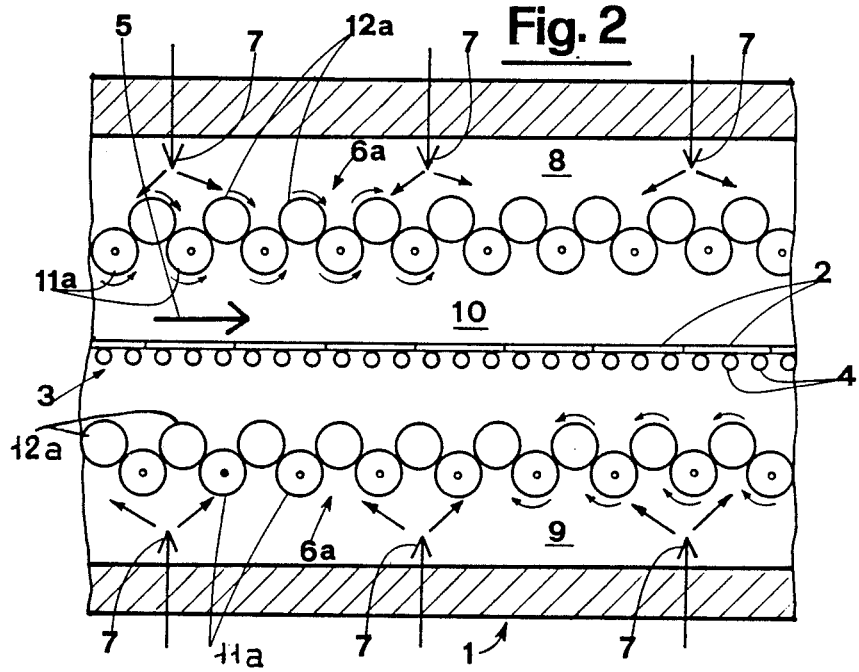
FIG. 2 is a schematic representation showing part of a kiln for the firing of ceramic tiles, viewed in longitudinal section through the median vertical plane and illustrating a second embodiment according to the invention.

The arrangement of single rollers 11 making up the wall 6 as illustrated in FIG. 1 might be replaced by that of FIG. 2. In this example, the radiant wall, denoted 6a in its entirety, is composed of a first plurality of driving bearer rollers 11a, disposed with axes parallel and set apart at a given distance one from the next, and a second plurality of freely revolving driven rollers 12a, each of which makes direct contact with two adjacent bearer rollers 11a. More exactly, the driven rollers 12a simply sit on the crests of the driving bearer rollers 11 a and are turned by friction. While equivalent in terms of the art to the embodiment of the wall first described, this arrangement offers notable advantages, inasmuch as the radiant wall 6a remains embodied as an array of rollers 11a and 12a disposed with axes parallel, one in direct contact with the next, each rotating in the opposite direction to the roller on either side, but affords a greater heat exchange surface area per linear unit length of the structure, hence better fluid-tight separation of burner chambers 8 and 9 and the treatment chamber 10; in addition, the roller drive system is made simpler, as the bearer rollers 11a only are positively driven, whereas the rollers denoted 12a are turned by friction, and one avoids any danger of serious damage occurring to the wall through the accidental entry of small foreign matter between adjacent rollers. In the event of such matter penetrating between rollers, there is nothing to prevent their shifting in response, since the carried rollers 12a are totally unrestrained in relation to the bearer rollers 11a. Similarly, the arrival on the top rollers 12a of a larger foreign body, say, a tile 2, will occasion no mishap, as it can simply ride over the surfaces of these rollers, propelled by friction, given that all rotate in the same direction. Furthermore, the wall 6a in question is less rigid overall, and therefore better able to withstand stresses attributable to thermal shock.

In a further embodiment of the invention, shown in FIGS. 3 and 3a, the radiant wall 6b is fashioned from hollow rollers 12b supported from within by driving bearer rollers 13. The single bearer roller 13 is characterized by an outer diameter that appears notably smaller than the internal diameter of the relative hollow roller by which it is accommodated. The bearer rollers 13 are arranged with their axes parallel, spaced apart at a given distance one from the next in such a way that the hollow rollers 12b form an unbroken succession, lying side by side one in contact with the next.

Further embodiments of the invention, shown in FIGS. 5 and 6, feature a radiant wall 6d or 6e that consist of rollers 11d or 11e with shaped profiles that mesh together in the manner of gear teeth. These specially matched rollers permit of obtaining different degrees of fluid-tight separation, and thus permit of embodying radiant walls capable of producing selective isolating conditions, suitable for the environments they happen to separate.

In all of the various embodiments illustrated, heat exchange is brought about substantially without regard to the heat conduction properties of the materials adopted in construction of the radiant wall; instead, the transfer of thermal energy is linked to the emission and absorption coefficients of the rotating bodies (rollers) making up the wall.

Increased efficiency of the heat exchange can be obtained through treatment of the roller surfaces, for example, by application of a coating that will invest them with emission and absorption properties approaching those of a black body; a thin surface layer would be sufficient. Such an expedient will be of special advantage in the type of embodiment shown in FIGS. 3 and 3a, where heat exchange is entirely the province of the hollow rollers 12b and the inner rollers 13 serve exclusively as a support medium.

What is claimed is:

1. A radiant wall, intended in particular for heat exchangers, muffle kilns and similar equipment, comprising:
   a plurality of rotating bodies arranged together to form a wall for the separation of two environments, said bodies containing means between which an exchange of thermal energy is brought about, said bodies being rotatable about axes lying parallel with the wall itself and comprising a plurality of variable speed rollers revolving side by side in mutual tangential contact, each roller rotating in an opposite direction to that of an adjacent roller, wherein said plurality of rollers comprises:
   a first plurality of driving rollers disposed to rotate on axes that are parallel and spaced apart at a given regular distance one from the next;
   a second plurality of driven rollers disposed to rotate on axes that are parallel and spaced apart at a given distance such that the axes of rotation of the driving rollers are located in a plane different from those of the driven rollers and wherein the regular distance spacing apart the driving rollers is less than a radius of each driven roller, such that each driven roller is supported by two adjacent driving rollers, associating therewith by direct contact, and set in rotation by friction.

2. The wall as in claim 1 wherein said first plurality of rollers comprises:
   a plurality of hollow rollers; and,
   at least one driving support roller disposed in each hollow roller for supporting said hollow roller, wherein each support roller has an external diameter notably smaller than an internal diameter of the hollow roller in which it is accommodated and wherein the support rollers are arranged with axes parallel and spaced apart at a given distance one from the next in such a way that mutual side-to-side contact is ensured between any two adjacent hollow rollers.

3. The wall as in claim 1 wherein the rollers are made of a ceramic refractory material, having an outer surface affording high emission and absorption coefficients.

4. The wall as in claim 1 wherein the rollers are made of a metallic refractory material having an outer surface affording high emission and absorption coefficients.

5. The wall as in claim 2 wherein the rollers are made of a ceramic refractory material having an outer surface affording high emission and absorption coefficients.

6. The wall as in claim 2 wherein the rollers are made of a metallic refractory material having an outer surface affording high emission and absorption coefficients.

7. The wall as in claim 1 wherein said second plurality of driven rollers is freely supported on said first plurality of driving rollers so that an axis of rotation of each driven roller can move.

* * * * *